(12) United States Patent
Stoschek et al.

(10) Patent No.: US 11,249,494 B2
(45) Date of Patent: Feb. 15, 2022

(54) SYSTEMS AND METHODS FOR SENSING AND AVOIDING EXTERNAL OBJECTS FOR AIRCRAFT

(71) Applicant: A^3 by Airbus LLC, Sunnyvale, CA (US)

(72) Inventors: Arne Stoschek, Palo Alto, CA (US); Zachary Thomas Lovering, Sunnyvale, CA (US); Alexander Dean Naiman, Santa Clara, CA (US); Cedric Cocaud, Santa Clara, CA (US)

(73) Assignee: A^3 by Airbus LLC, Sunnyvale, CA (US)

( * ) Notice: Subject to any disclaimer, the term of this patent is extended or adjusted under 35 U.S.C. 154(b) by 127 days.

(21) Appl. No.: 16/611,427

(22) PCT Filed: May 8, 2018

(86) PCT No.: PCT/US2018/031610
§ 371 (c)(1),
(2) Date: Nov. 6, 2019

(87) PCT Pub. No.: WO2018/208784
PCT Pub. Date: Nov. 15, 2018

(65) Prior Publication Data
US 2020/0166956 A1 May 28, 2020

Related U.S. Application Data

(60) Provisional application No. 62/503,311, filed on May 8, 2017.

(51) Int. Cl.
*G05D 1/10* (2006.01)
*G06K 9/62* (2006.01)
(Continued)

(52) U.S. Cl.
CPC ......... *G05D 1/1064* (2019.05); *G05D 1/1062* (2019.05); *G06K 9/6267* (2013.01); *G01S 13/933* (2020.01); *G01S 17/933* (2013.01)

(58) Field of Classification Search
CPC .. G05D 1/1064; G05D 1/1062; G06K 9/6267; G01S 13/933; G01S 17/933
(Continued)

(56) References Cited

U.S. PATENT DOCUMENTS

| 2009/0076728 A1 | 3/2009 | Bouchet |
| 2013/0124020 A1 | 5/2013 | Duggan et al. |

(Continued)

FOREIGN PATENT DOCUMENTS

WO  2016179802 A1  11/2016

*Primary Examiner* — Gertrude Arthur Jeanglaude
(74) *Attorney, Agent, or Firm* — Maynard Cooper & Gale, P.C.; Jon E. Holland, Esq.

(57) ABSTRACT

A monitoring system for an aircraft has sensors that are used to sense the presence of objects around the aircraft for collision avoidance, navigation, or other purposes. At least one of the sensors may be configured to sense objects around the aircraft and provide data indicative of the sensed objects. The monitoring system may use information from the sensor and information about the aircraft to determine an escape envelope including possible routes that the aircraft can follow to avoid colliding with the object. The monitoring system may select an escape path based on the escape envelope and control the aircraft to follow the escape path to avoid collision with one or more objects.

37 Claims, 10 Drawing Sheets

(51) Int. Cl.
  *G01S 13/933* (2020.01)
  *G01S 17/933* (2020.01)
(58) Field of Classification Search
  USPC .............................................................. 701/3
  See application file for complete search history.

(56) References Cited

U.S. PATENT DOCUMENTS

2015/0021431 A1\* 1/2015 Kracht .................. B64D 45/00
                                                              244/50
2016/0376004 A1   12/2016 Claridge et al.
2019/0291862 A1    9/2019 Lyasoff et al.

\* cited by examiner

SYSTEMS AND METHODS FOR SENSING AND AVOIDING EXTERNAL OBJECTS FOR AIRCRAFT

CROSS REFERENCE TO RELATED APPLICATION

This application claims Priority to U.S. Provisional Application No. 62/503,311, entitled "Systems and Methods for Sensing and Avoiding External Objects for Aircraft" and filed on May 8, 2017, which is incorporated herein by reference.

BACKGROUND

Aircraft may encounter a wide variety of collision risks during flight, such as debris, other aircraft, equipment, buildings, birds, terrain, and other objects. Collision with any such object may cause significant damage to an aircraft and, in some cases, injure its occupants. Sensors can be used to detect objects that pose a collision risk and warn a pilot of the detected collision risks. If an aircraft is self-piloted, sensor data indicative of objects around the aircraft may be used by a controller to avoid collision with the detected objects. In other examples, objects may be sensed and classified for assisting with navigation or control of the aircraft in other ways.

To ensure safe and efficient operation of an aircraft, it is desirable for the aircraft to detect objects in the space around the aircraft. However, detecting objects around an aircraft and determining a suitable path for the aircraft to follow in order to avoid colliding with the objects can be challenging. As an example, for an aircraft, it is possible for there to be a large number of objects within its vicinity, and such objects may be located in any direction from the aircraft and moving in various directions at various speeds. Further, any failure to accurately detect and avoid an object can be catastrophic. Systems capable of performing the assessments needed to reliably detect and avoid objects external to the aircraft may be expensive or burdensome to design or implement.

Improved techniques for reliably detecting and avoiding objects within a vicinity of an aircraft are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

DETAILED DESCRIPTION

The present disclosure generally pertains to vehicular systems and methods for sensing and avoiding external objects for aircraft. In some embodiments, an aircraft includes an aircraft monitoring system having sensors that are used to sense the presence of objects around the aircraft for collision avoidance, navigation, or other purposes. At least one of the sensors may be configured to sense objects within the sensor's field of view and provide sensor data indicative of the sensed objects. The aircraft may then be controlled based on the sensor data. As an example, the speed or direction of the aircraft may be controlled in order to avoid collision with a sensed object, to navigate the aircraft to a desired location relative to a sensed object, or to control the aircraft for other purposes.

When the aircraft monitoring system senses an object that is a collision threat, the aircraft monitoring system can generate an escape envelope for the aircraft. The escape envelope may be based on various information and define a range of possible paths for the aircraft to follow. The system can generate the escape envelope using information about the sensed object, the aircraft, the aircraft's route, or other information. Using sensor data, the system can determine the object's location and velocity, and classify the type of object sensed. The system can determine distance between the object and aircraft, as well as maneuvering capabilities for the object based on the identified object type. The system also can use information about the aircraft, such as its capabilities (e.g., maneuverability), energy budget, or operating status, to create the escape envelope. The system can also use information about the route the aircraft is traveling, such as known object locations, airspace restrictions, or weather conditions.

Once the system generates the escape envelope, it may identify and validate an escape path that is within the envelope. The escape path may represent a route that the aircraft can follow to safely avoid a collision with the object. The system can select an escape path by accounting for various information, such as maneuver safety margins or effects on passenger comfort or cargo integrity. For example, the selected escape path may allow the aircraft to avoid colliding without requiring maneuvers that would otherwise cause undue discomfort to a passenger. The system may validate the escape path, such as based on information about the aircraft's current capabilities or operations, and provide the escape path for the aircraft controller to follow if the system determines the path is valid. Otherwise, the aircraft monitoring system may use new information to update the escape envelope and select a new escape path.

Figure 1:
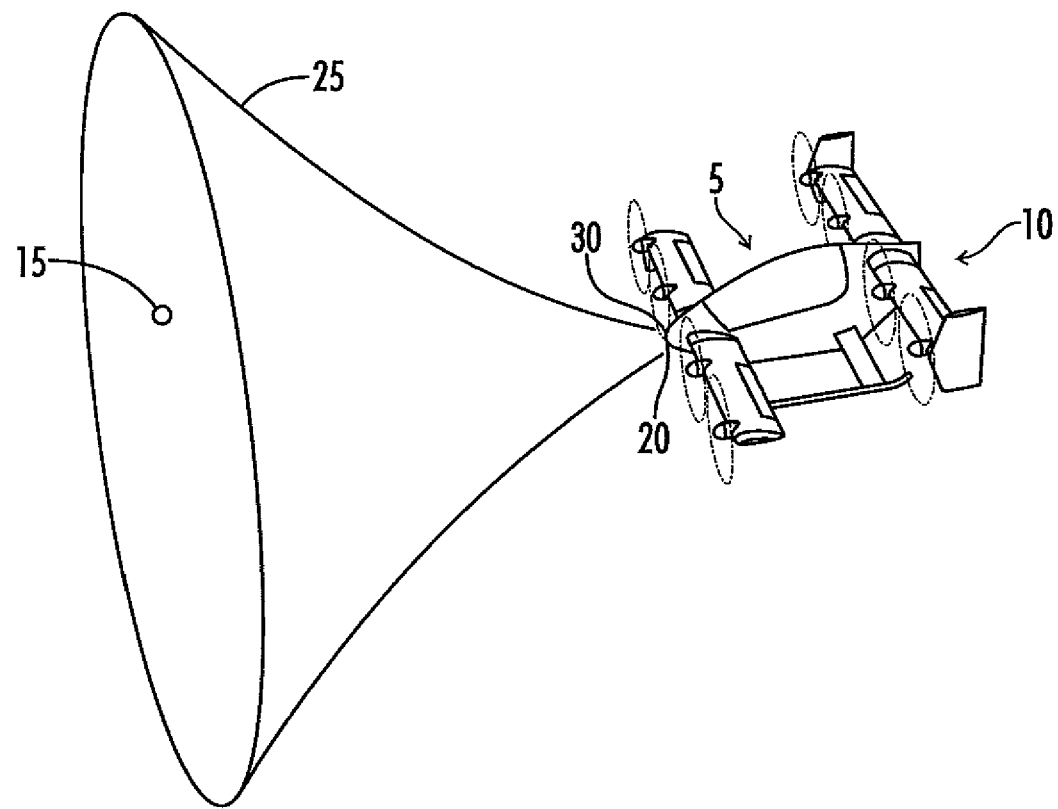
FIG. 1 depicts a three-dimensional perspective view of an aircraft having an aircraft monitoring system in accordance with some embodiments of the present disclosure.

FIG. 1 depicts a three-dimensional perspective view of an aircraft 10 having an aircraft monitoring system 5 in accordance with some embodiments of the present disclosure. The system 5 is configured to use sensors 20, 30 to detect an object 15 that is within a certain vicinity of the aircraft 10, such as near a flight path of the aircraft 10. The system 5 is also configured to determine information about the aircraft 10 and its route. The system 5 can determine a safe escape path for the aircraft 10 to follow that will avoid a collision with the object 15.

Note that the object 15 can be of various types that aircraft 10 may encounter during flight. As an example, the object 15 may be another aircraft, such as a drone, airplane or helicopter. The object 15 also can be a bird, debris, or terrain that are close to a path of the aircraft 10. In some embodiments, object 15 can be various types of objects that may damage the aircraft 10 if the aircraft 10 and object 15 collide. In this regard, the aircraft monitoring system 5 is configured to sense any object 15 that poses a risk of collision and classify it as described herein.

The object 15 of FIG. 1 is depicted as a single object that has a specific size and shape, but it will be understood that object 15 may have various characteristics. In addition, although a single object 15 is depicted by FIG. 1, there may be any number of objects 15 within a vicinity of the aircraft 10 in other embodiments. The object 15 may be stationary, as when the object 15 is a building, but in some embodiments, the object 15 may be capable of motion. For example, the object 15 may be another aircraft in motion along a path that may pose a risk of collision with the aircraft 10. The object 15 may be other obstacles (e.g., terrain or buildings) posing a risk to safe operation of aircraft 10 in other embodiments.

The aircraft 10 may be of various types, but in the embodiment of FIG. 1, the aircraft 10 is depicted as an autonomous vertical takeoff and landing (VTOL) aircraft 10. The aircraft 10 may be configured for carrying various types of payloads (e.g., passengers, cargo, etc.). Although the embodiments disclosed herein generally concern functionality ascribed to aircraft monitoring system 5 as implemented in an aircraft, in other embodiments, systems having similar functionality may be used with other types of vehicles 10, such as automobiles or watercraft. The aircraft 10 may be manned or unmanned, and may be configured to operate under control from various sources. In the embodiment of FIG. 1, the aircraft 10 is configured for self-piloted (e.g., autonomous) flight. As an example, aircraft 10 may be configured to perform autonomous flight by following a predetermined route to its destination. The aircraft monitoring system 5 is configured to communicate with a flight controller (not shown in FIG. 1) on the aircraft 10 to control the aircraft 10 as described herein. In other embodiments, the aircraft 10 may be configured to operate under remote control, such as by wireless (e.g., radio) communication with a remote pilot. Various other types of techniques and systems may be used to control the operation of the aircraft 10.

In the embodiment of FIG. 1, the aircraft 10 has one or more sensors 20 of a first type (e.g., cameras) for monitoring space around aircraft 10, and one or more sensors 30 of a second type (e.g., radar or LIDAR) for providing redundant sensing of the same space or sensing of additional spaces. In some embodiments, the sensors 20, 30 may sense the presence of an object 15 within the field of view and provide sensor data indicative of a location of the object 15. Such sensor data may then be processed to determine whether the object 15 presents a collision threat to the vehicle 10. In addition, any of the sensors 20, 30 may comprise any optical or non-optical sensor for detecting the presence of objects, such as a camera, an electro-optical or infrared (EO/IR) sensor, a light detection and ranging (LIDAR) sensor, a radio detection and ranging (radar) sensor, or other sensor type. Exemplary techniques for sensing objects using sensors 20, 30 are described in PCT Application No. PCT/US2017/25592 and PCT Application No. PCT/US2017/25520, each of which is incorporated by reference herein in its entirety.

FIG. 1 further shows an escape envelope 25 generated by the aircraft monitoring system 5 in response to detection of the object 15. The escape envelope 25 defines the boundaries of a region through which escape paths may be selected. The escape envelope may be based on various factors, such as the current operating conditions of the aircraft (e.g., airspeed, altitude, orientation (e.g., pitch, roll, or yaw), throttle settings, available battery power, known system failures, etc.), capabilities (e.g., maneuverability) of the aircraft under the current operating conditions, weather, restrictions on airspace, etc. Generally, the escape envelope 25 defines a range of paths that the aircraft is capable of flying under its current operating conditions. The escape envelope 25 generally widens at points further from the aircraft 10 indicative of the fact that the aircraft 10 is capable of turning farther from its present path as it travels. In the embodiment shown by FIG. 1, the escape envelope is in the shape of a funnel, but other shapes are possible in other embodiments.

Figure 2:
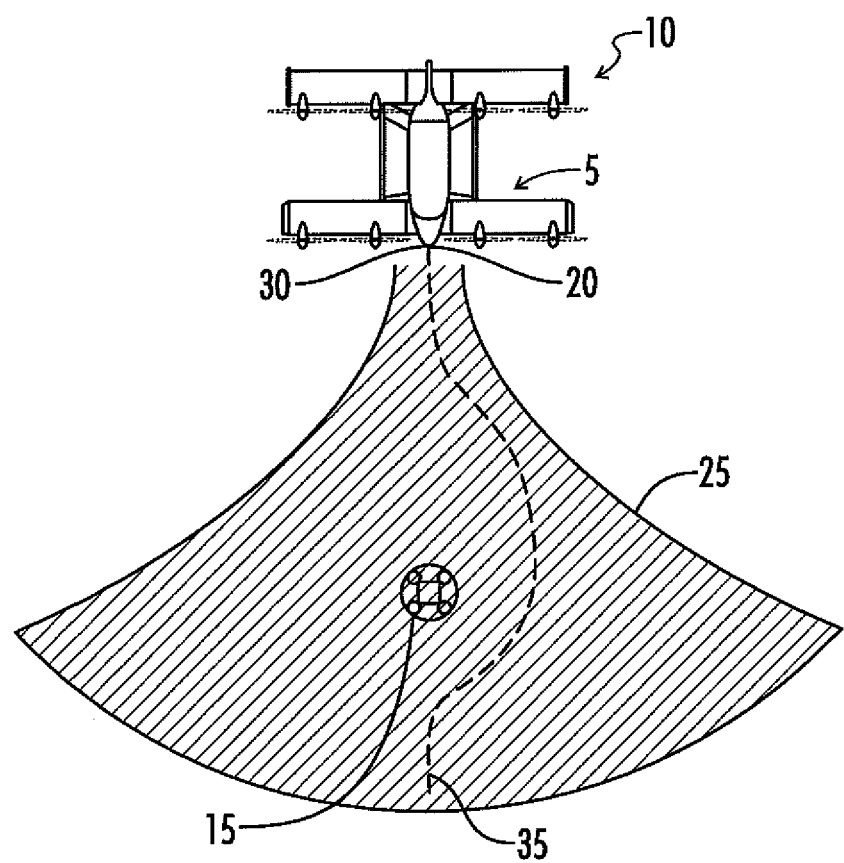
FIG. 2 depicts a top perspective view of an aircraft, such as is depicted by FIG. 1, in accordance with some embodiments of the present disclosure.

Moreover, when an object 15 is identified in data sensed by sensors 20, 30, the aircraft monitoring system 5 may use information about the aircraft 10 to determine an escape envelope 25 that represents a possible range of paths that aircraft 10 may safely follow (e.g., within a pre-defined margin of safety or otherwise). Based on the escape envelope 25, the system 5 then selects an escape path within the envelope 25 for the aircraft 10 to follow in order to avoid the detected object 15. In this regard, FIG. 2 depicts an exemplary escape path 35 identified and validated by the system 5. In identifying the escape path 35, the system 5 may use information from sensors 20, 30 about the sensed object 15, such as its location, velocity, and probable classification (e.g., that the object is a bird, aircraft, debris, building, etc.). Escape path 35 may also be defined such that the aircraft will return to the approximate heading that the aircraft was following before it's performed evasive maneuvers.

Note that the escape path 35, although generated based on the information indicated by the escape envelope 25, may be validated by system 5 to ensure that it is safe based on the most current data available. For example, during the time between detection of an object 15 by sensors 20, 30, classification of the object 15, determination of the escape envelope 25, and selection of a proposed escape path 25, conditions on which the original escape envelope 25 were based, such as operational status of a system of the aircraft 10 (e.g., batteries), may have changed. In this regard, the system 5 may perform a validation check to ensure that no such changes have occurred that may render the proposed escape path 35 unsafe or otherwise less preferable to another potentially available path for the aircraft 10 to follow. The system 5 may update the escape envelope 25 based on its detection of changing conditions of the aircraft 10 and determine potential escape paths 35 until an escape path 35 for the aircraft 10 is validated.

In addition, it should also be noted that there may be any number of objects 15 that pose a collision threat to the aircraft 10 at any given time. Some of these objects 15 may be "cooperative" in that they communicate with the aircraft 10 to convey information about the object 15, such as its route, location, heading, speed, size, or other information, and some of the objects may be "uncooperative" in that they do not communicate information that can be used by the sense and avoid element 207 or other device or system for assisting with collision avoidance by aircraft 10. For each sensed object, the sense and avoid element 207 may determine a threat envelope and select an escape path 35 that avoids all of the objects 15 according to the techniques described herein.

Figure 3:
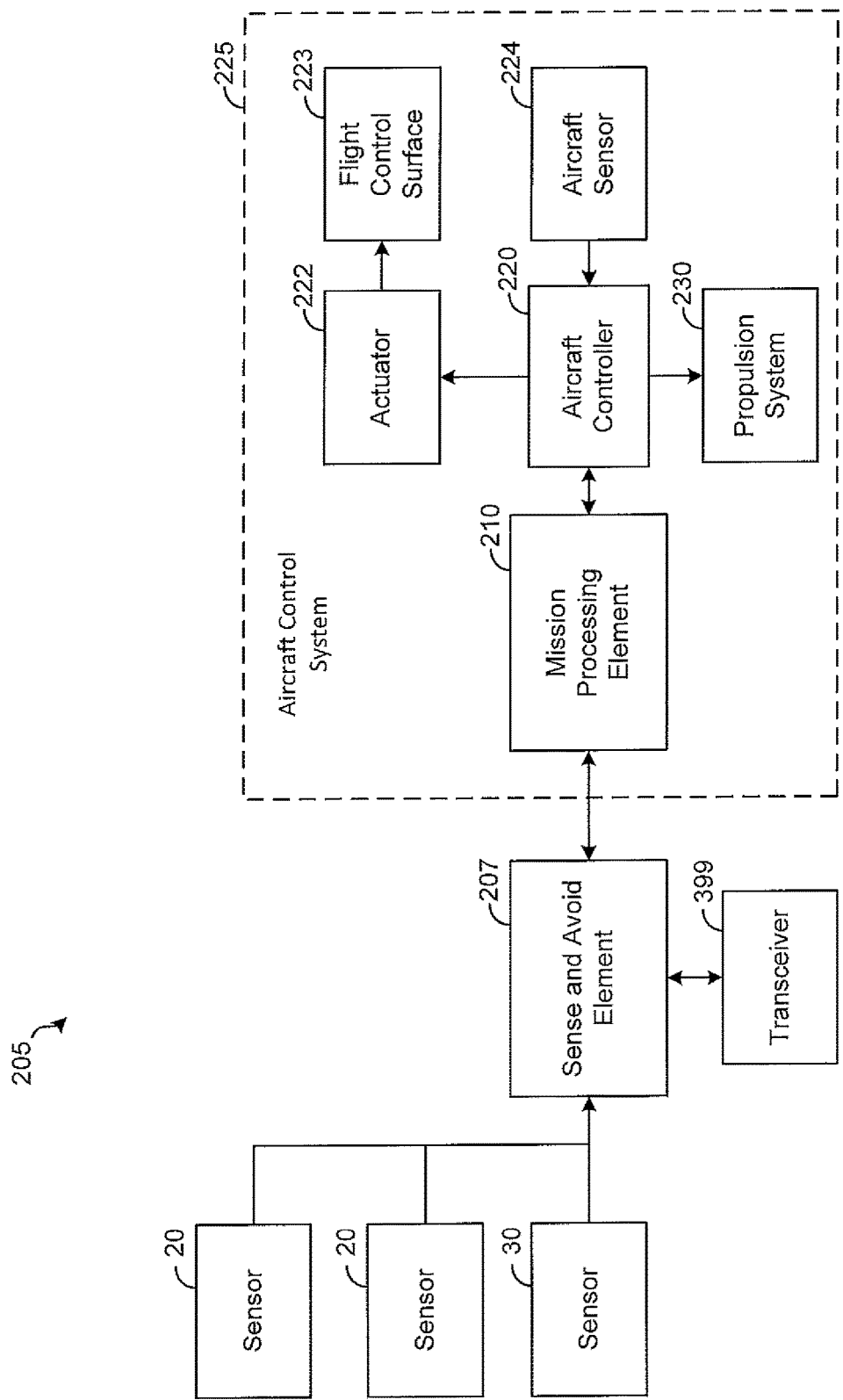
FIG. 3 is a block diagram illustrating various components of an aircraft monitoring system in accordance with some embodiments of the present disclosure.

FIG. 3 is a block diagram illustrating various components of an aircraft monitoring system 205 in accordance with some embodiments of the present disclosure. As shown by FIG. 3, the aircraft monitoring system 205 may include a sense and avoid element 207, mission processing element 210, a plurality of sensors 20, 30, and an aircraft control system 225. Although particular functionality may be ascribed to various components of the aircraft monitoring system 205, it will be understood that such functionality may be performed by one or more components of the system 205 in some embodiments. In addition, in some embodiments, components of the system 205 may reside on the aircraft 10 or otherwise, and may communicate with other components of the system 205 via various techniques, including wired (e.g., conductive), optical, or wireless communication (e.g., using a wireless network or short-range wireless protocol, such as Bluetooth). Further, the system 205 may comprise various components not specifically depicted in FIG. 3 for achieving the functionality described herein and generally performing threat-sensing operations and aircraft control.

The sense and avoid element 207 of aircraft monitoring system 205 may perform processing of sensor data and envelope data (e.g., escape envelope data) received from aircraft control system 225 to determine an escape path 35. In some embodiments, as shown by FIG. 3, the sense and avoid element 207 may be coupled to each sensor 20, 30, process the sensor data from the sensors 20, 30, and provide signals to the mission processing element 210 of aircraft control system 225. The sense and avoid element 207 may be various types of devices capable of receiving and processing sensor data from sensors 20, 30 and envelope data from mission processing element 210. The sense and avoid element 207 may be implemented in hardware or a combination of hardware and software/firmware. As an example, the sense and avoid element 207 may comprise one or more application-specific integrated circuits (ASICs), field-programmable gate arrays (FPGAs), microprocessors programmed with software or firmware, or other types of circuits for performing the described functionality. An exemplary configuration of the sense and avoid element 207 will be described in more detail below with reference to FIG. 4.

In some embodiments, the aircraft control system 225 may include mission processing element 210, aircraft controller 220, propulsion system 230, actuator 222, and aircraft sensor 224. The mission processing element 210 may be coupled to the sense and avoid element 207 and aircraft controller 220, and may be of various types capable of receiving and processing data from the sense and avoid element 207 and aircraft controller 220, and may be implemented in hardware or a combination of hardware and software. As an example, the mission processing element 210 may comprise one or more application-specific integrated circuits (ASICs), field-programmable gate arrays (FPGAs), microprocessors programmed with software or firmware, or other types of circuits for performing the described functionality. An exemplary configuration of the mission processing element 210 will be described in more detail below with reference to FIG. 5.

The aircraft controller 220 may be coupled to each of the mission processing element 210, actuator 222, aircraft sensor 224, and propulsion system 230 for controlling various operations of aircraft 10. In some embodiments, the aircraft controller 220 may perform suitable control operations of the aircraft 10 by providing signals or otherwise controlling a plurality of actuators 222 that may be respectively coupled to one or more flight control surfaces 223, such as an aileron, flap, elevator, or rudder. Although a single actuator 222 and flight control surface 223 is depicted in FIG. 3 for simplicity of illustration, various numbers of actuators 222 and flight control surfaces 223 are possible to achieve flight operations of aircraft 10.

One or more aircraft sensors 224 may monitor operation and performance of various components of the aircraft 10 and may send feedback indicative of such operation and performance to the controller 220. Although a single sensor 224 is depicted in FIG. 3 for simplicity of illustration, in some embodiments various numbers of aircraft sensors 224 possible. As an example, an aircraft sensor 224 may be coupled to an actuator 222 for monitoring the actuator's operation and reporting it to the aircraft controller 220 for processing. A sensor 224 also may be coupled to sense operation of components of propulsion system 230 and provide the sensed data to aircraft controller 220. In response to the information provided by the aircraft sensor 224 about performance of the systems of the aircraft 10, the aircraft controller 220 may control the aircraft 10 to perform flight operations.

Further, the propulsion system 230 may comprise various components, such as engines and propellers, for providing propulsion or thrust to aircraft 10. As will be described in more detail hereafter, when the sense and avoid element 207 senses an object 15 (FIGS. 1, 2), the mission processing element 210 may be configured to provide a signal to vehicle controller 220 to control the resources of aircraft control system 225 (e.g., actuators 222 and the propulsion system 230) to change the velocity (speed and/or direction) of the aircraft 10. As an example, the aircraft controller 220 may control the velocity of the aircraft 10 in an effort to follow an escape path 35, thereby avoiding a sensed object 15. Alternatively, the aircraft controller 220 may navigate to a desired destination or other location based on the sensed object 15.

Figure 4:
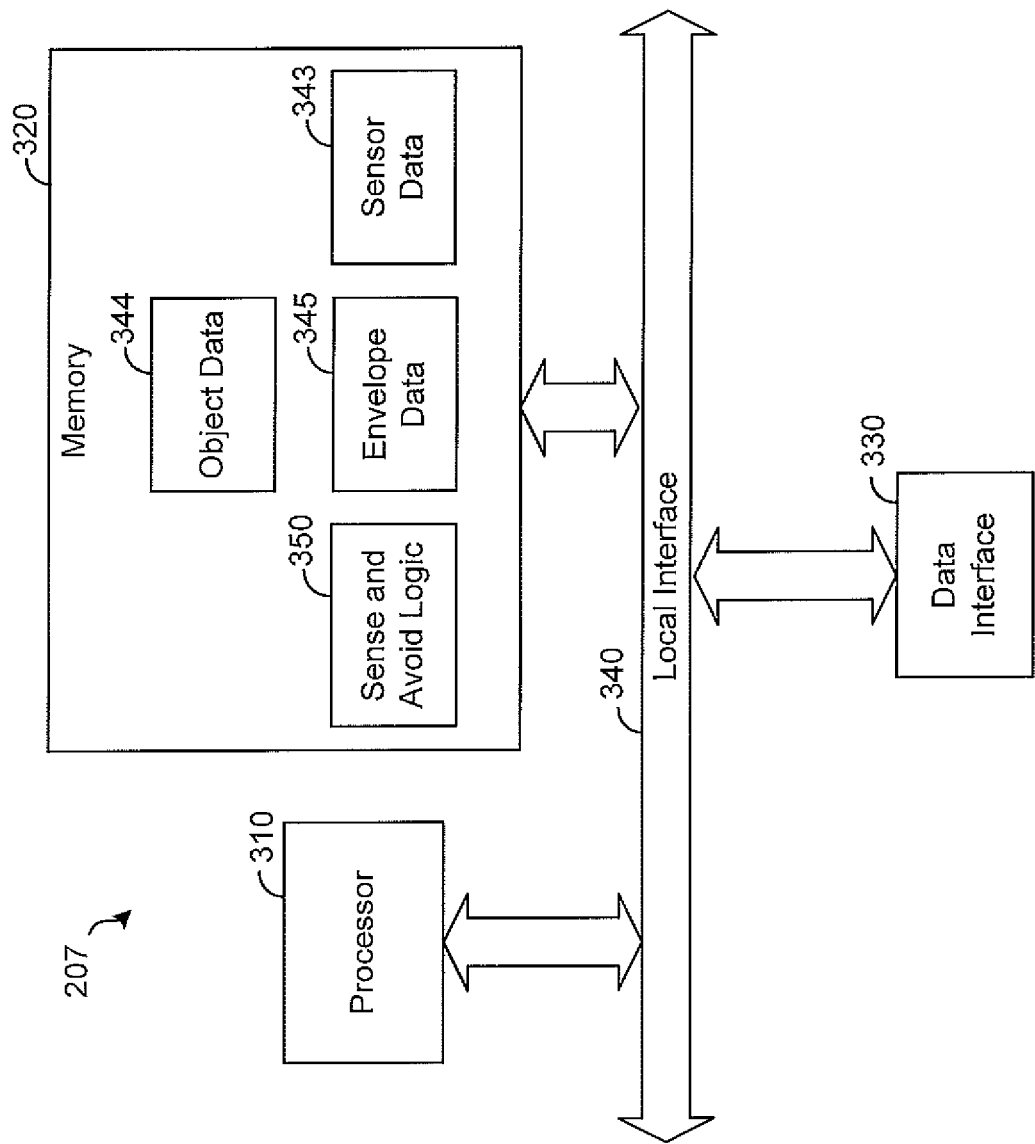
FIG. 4 is a block diagram illustrating a sense and avoid element in accordance with some embodiments of the present disclosure.

FIG. 4 depicts a sense and avoid element 207 in accordance with some embodiments of the present disclosure. As shown by FIG. 4, the sense and avoid element 207 may include one or more processors 310, memory 320, a data interface 330 and a local interface 340. The processor 310 may be configured to execute instructions stored in memory in order to perform various functions, such as processing of sensor data from the sensors 20, 30 (FIGS. 1, 2) and envelope data from mission processing element 310 (FIG. 3). The processor 310 may include a central processing unit (CPU), a digital signal processor (DSP), a graphics processing unit (GPU), an FPGA, other types of processing hardware, or any combination thereof. Further, the processor 310 may include any number of processing units to provide faster processing speeds and redundancy, as will be described in more detail below. The processor 310 may communicate to and drive the other elements within the sense and avoid element 207 via the local interface 340, which can include at least one bus. Further, the data interface 330 (e.g., ports or pins) may interface components of the sense and avoid element 207 with other components of the system 5, such as the sensors 20, 30 and the mission processing element 210.

As shown by FIG. 4, the sense and avoid element 207 may comprise sense and avoid logic 350, which may be implemented in hardware, software, firmware or any combination thereof. In FIG. 4, the sense and avoid logic 350 is implemented in software and stored in memory 320 for execution by the processor 310. However, other configurations of the sense and avoid logic 350 are possible in other embodiments.

Note that the sense and avoid logic 350, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The sense and avoid logic 350 is configured to receive data sensed by sensors 20, and 30, classify an object 15 based on the data and assess whether there is a collision risk between object 15 and aircraft 10. Sense and avoid logic 350 is configured to identify a collision threat based on various information such as the object's location and velocity. As an example, the sense and avoid logic 350 may estimate a path of the object 15 based on its sensed position and velocity and compare the current path of the aircraft 10 to the estimated path of the object 15 to determine how close the aircraft will likely come to the object 15. If the distance between the two paths is below a threshold, the sense and avoid logic 350 may identify the object 15 as a collision threat. Note that the determination of whether an object 15 is a collision threat may be based on other factors, such as the object's size, velocity and maneuverability. For example, a large, fast and highly maneuverable object 15 may be a collision threat at a greater distance from the aircraft 10 relative to an object 15 that is slower, smaller or less maneuverable.

In some embodiments, the sense and avoid logic 350 is configured to classify the object 15 in order to better assess its possible flight performance, such as speed and maneuverability, and threat risk. In this regard, the sense and avoid element 207 may store object data 344 indicative of various types of objects, such as birds or other aircraft, that might be encountered by the aircraft 10 during flight. For each object type, the object data 344 defines a signature that can be compared to sensor data 343 to determine when a sensed object corresponds to the object type. As an example, the object 344 may indicate the expected size and shape for an object that can be compared to an object's actual size and shape to determine whether the object 15 matches the object type. It is possible to identify not just categories of objects (e.g., bird, drone, airplane, helicopter, etc.) but also specific object types within a category. As an example, it is possible to identify an object as a specific type of airplane (e.g., a Cessna 172). In some embodiments, the sense and avoid element 207 may employ a machine learning algorithm to classify object types.

For each object type, the object data 344 defines information indicative of the object's performance capabilities and threat risk. As an example, the object data 344 may indicate a likely or normal speed range and maneuverability (or other flight performance characteristics) for the object type, and such information may be used to predict the object's movements as the aircraft 10 approaches the object 15. In this regard, the sense and avoid logic 350 may determine a threat envelope, similar to the escape envelope 25 described above for aircraft 10, defining the boundaries of a region through which object is likely to pass based on the performance characteristics indicated for its object type. The escape path 35 may be selected by the sense and avoid logic 350 such that it does not pass through and/or remains at least a specified distance from the threat envelope of a detected object 15. In other embodiments, other techniques for selecting a path to avoid an identified object based on the flight performance characteristics of its classification are possible.

In any event, once the sense and avoid logic 350 identifies and classifies the object 15, the logic 350 may determine a value, referred to herein as a "risk score," indicating a degree of risk associated with the object. The risk score may be based on various factors associated with the object, such as its size and performance characteristics. For example, objects capable of greater speeds and maneuverability and having greater sizes may be associated with higher risk scores indicating that they pose a greater risk to the aircraft 10. Such risk score may be used to determine a desired safety margin for the escape path 35 to be selected. As an example, for an object associated with the greater risk score, the sense and avoid logic 350 may require a greater separation distance between the escape path 35 and the expected path or threat envelope of the object 15.

As an example, assume that the sense and avoid logic 350 based on data from sensors 20, 30 detects an object 15 at a certain location within the vicinity of the aircraft's route. If the object is classified as a bird (e.g., a goose), the sense and avoid logic 350 may assess a relatively low risk score for the object 15 and determine a relatively small threat envelope for the object 15 based on the capabilities of the object's classification indicated by the object data. In such case, the sense and avoid logic 350 may select an escape path 35 that results in a relatively small deviation from the aircraft's current route bringing the aircraft 10 relatively close to the identified object 15 as it passes the object 15.

However, assume that the object 15 is instead classified as a highly-maneuverable object, such as an aircraft type that is associated with high performance characteristics by the object data 344. In such case, the threat envelope determined for the object 15 by the sense and avoid logic 350 is likely to be much greater than the one described above for the bird due to the higher performance characteristics. In addition, the sense and avoid logic 350 is likely to assess a higher risk score indicating that the object is associated with a greater risk profile relative to the example described above for the bird. In such an example, the sense and avoid logic 350 may select an escape path that results in a larger deviation from the aircraft's current route relative to the escape path described above for the bird. Further, since the object 15 is associated with a greater risk score, the escape path may be selected such that the distance between the aircraft 10 and the threat envelope is greater in order to provide a higher safety margin for avoiding the object 15. In both examples, the actual escape path selected may be based on other factors, such as the amount of power remaining or any of the other factors described herein.

Note that, in some embodiments, sense and avoid logic 350 may be configured to use information from other aircraft 10 for detecting the presence or location of objects 15. For example, in some embodiments, the aircraft 10 may be one unit of a fleet of aircraft which may be similarly configured for detecting objects within a vicinity of the aircraft. Further, the aircraft may be configured to communicate with one another in order to share information about sensed objects. As an example, the sense and avoid element 207 may be coupled to a transceiver 399, as shown by FIG. 3, for communicating with other aircraft. When the sense and avoid element 207 senses an object 15, it may transmit information about the object 15, such as the object's type, location, velocity, performance characteristics, or other information, to other aircraft so that sense and avoid elements on the other aircraft can monitor and avoid the object 15 according to the techniques described herein. Further, the sense and avoid element 207 may receive similar information about objects 15 detected by other aircraft, and use such information to monitor and avoid such objects 15. In some embodiments, mediation between vehicles may occur via various types of protocols, such as ADS-B beacons.

As described above, the sense and avoid element 207 is configured to receive data 345, referred to herein as "envelope data," indicative of the escape envelope 25 from the mission processing element 210, and the sense and avoid logic 350 is configured to use the escape envelope 25 to propose an escape path 35 to the mission processing element 210. Note that the sense and avoid logic 350 may identify an escape path to propose based on various information, including the risk score for the object 15, the object's location and velocity, and the object's performance characteristics, as well as other information relevant to selecting a safe escape path 35 for the aircraft 10. In addition, the sense and avoid logic 350 may propose an escape path that will direct aircraft 10 to its previous route to its destination once the sense and avoid logic 350 determines that the object 15 is no longer a collision threat.

The sense and avoid logic 350 is configured to process sensor data 343 and envelope data 345 dynamically as new data become available. As an example, when sense and avoid element 207 receives new data from sensors 20, 30 or mission processing element 210, the sense and avoid logic 350 processes the new data and updates any determinations previously made as may be desired. The sense and avoid logic 350 thus may update an object's location, velocity, threat envelope, etc. when it receives new information from sensors 20, 30. In addition, the sense and avoid logic 350 may receive an updated escape envelope 25 from mission processing element 210 and may use the updated information to select a new escape path to propose to mission processing element 210 within the escape envelope. Thus, the sensor data 343 and the envelope data 345 are repetitively updated as conditions change.

Figure 5:
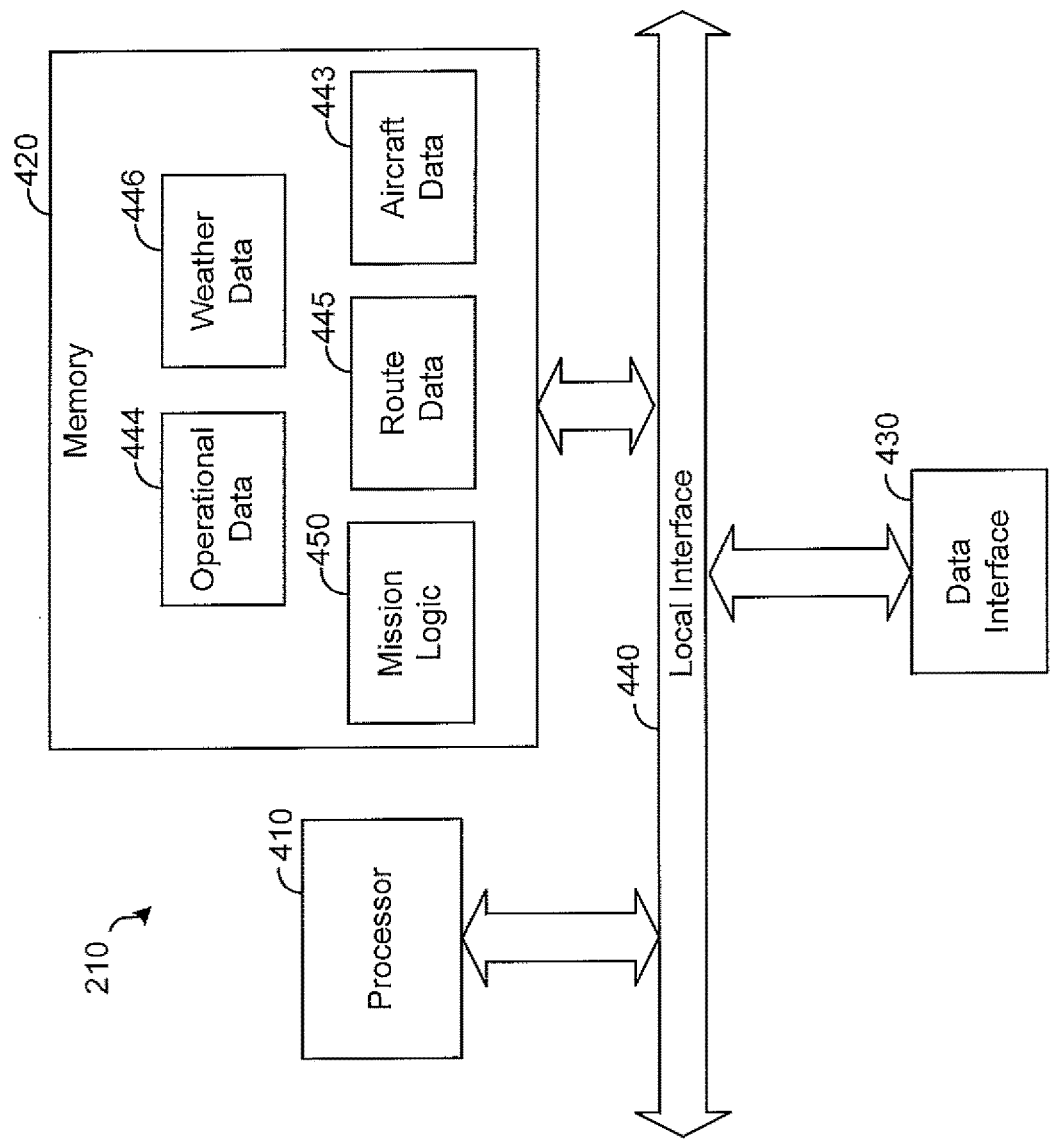
FIG. 5 is a block diagram illustrating a mission processing element in accordance with some embodiments of the present disclosure.

FIG. 5 depicts a mission processing element 210 in accordance with some embodiments of the present disclosure. As shown by FIG. 5, the mission processing element 210 may include one or more processors 410, memory 420, a data interface 430 and a local interface 440. The processor 410 may be configured to execute instructions stored in memory in order to perform various functions, such as processing of aircraft data 443 and route data 445. The processor 410 may include a central processing unit (CPU), a digital signal processor (DSP), a graphics processing unit (GPU), an FPGA, other types of processing hardware, or any combination thereof. Further, the processor 410 may include any number of processing units to provide faster processing speeds and redundancy. The processor 410 may communicate to and drive the other elements within the mission processing element 210 via the local interface 440, which can include at least one bus. Further, the data interface 430 (e.g., ports or pins) may interface components of the mission processing element 210 with other components of the system 5, such as the sense and avoid element 207 and the aircraft controller 220.

As shown by FIG. 5, the mission processing element 210 may comprise mission logic 450, which may be implemented in hardware, software, firmware or any combination thereof. In FIG. 5, the mission logic 450 is implemented in software and stored in memory 420 for execution by processor 410. However, other configurations of the mission logic 450 are possible in other embodiments. Note that the mission logic 450, when implemented in software, can be stored and transported on any computer-readable medium for use by or in connection with an instruction execution apparatus that can fetch and execute instructions.

The mission logic 450 may be configured to process information, such as aircraft data 443, operational data 444, route data 445, and weather data 446, to generate an escape envelope 25 and provide it to the sense and avoid element 207, as described above. The aircraft data 443 includes information about the performance characteristics of the aircraft 10, such as its various speeds (e.g., never-to-exceed speed, normal operating speeds for various flight configurations, stall speed, etc.), maneuverability, power requirements, and other information useful in determining the aircraft's capabilities and flight performance. The aircraft data 443 may also indicate various information about the aircraft 10, such as weight of at least one passenger or cargo and whether any passengers are on board the aircraft 10, that might limit or otherwise affect the flight performance characteristics of the aircraft 10. In one embodiment, the weight of a passenger or cargo may be automatically sensed by a sensor 20 or may otherwise be determined, such as for example input by a user. Note that the aircraft data 443 may indicate different characteristics for different flight configurations. As an example, the performance characteristics of the aircraft 10 when all components, such as propellers or engines, are operating is likely different after a failure of one or more components (e.g., propellers), and the aircraft 443 data may indicate performance of the aircraft 10 when it is experiencing certain component failures. The aircraft data 443 may be predefined based on manufacture specifications or testing of the aircraft 443 prior to operation.

The operational data 444 includes information about the current operating conditions of the aircraft 10, such as the aircraft's current heading, speed, altitude, throttle settings, pitch, roll, yaw, fuel level or battery power, and other operational information. Such information may be received by the mission processing element 210 from one or more aircraft sensors for sensing the indicated operating conditions or the aircraft controller 220. The operational data 444 may also include information about current failures detected by the system 225, such as an electrical (e.g., battery) failure, a failure of a flight control surface 223 or actuator 222, a failure of the propulsion system 230 (e.g., a propeller or engine), or a failure of another component of the aircraft 10.

The route data 445 includes information about the route that the aircraft 10 is flying. As an example, the route data 445 may define the waypoints to be used for navigating the aircraft 10 to its desired destination, and the route data 445 may indicate various obstacles or objects (e.g., buildings, bridges, towers, terrain, etc.) along the route that may be used for collision avoidance or navigation. The route data 445 may also indicate the locations of restricted airspace (e.g., airspace through which the aircraft 10 is not permitted to fly). The route data 445 may be updated by the mission logic 450 based on communications with remote systems for air traffic control or other purposes. As an example, the aircraft 10 may be assigned a block or corridor of airspace in which the aircraft 10 must remain thereby limiting the possible routes that the aircraft 10 may take to avoid an object 15. The route data 445 may be predefined and, if desired, updated by the mission processing element 210 as information about the route is sensed, such as new stationary obstacles along the route or new air traffic control instructions.

The weather data 446 includes information about weather within a vicinity of the aircraft 20, such as within several miles of the aircraft 10. The weather data 446 may indicate winds, precipitation, lightning, thunderstorms, icing, and other weather phenomena that may impact the flight performance of the aircraft 10. The weather data 446 may be generated by an onboard weather radar (not shown) or other weather sensor, or the weather data 446 may be received wirelessly from a remote location as the aircraft 10 travels. As an example, the aircraft 10 may have a receiver that is configured to receive and process weather data from the National Weather Service or other source of weather information.

The mission logic 450 is configured to generate an escape envelope 25 based on the various information stored in memory 420. In this regard, the mission logic 450 is configured to calculate the range of paths that the aircraft 10 is capable of taking based on its current operating conditions and flight performance characteristics. In this regard, there are at least some paths that the aircraft 10 is incapable of flying or should not fly due to performance limitations indicated by the aircraft data 443 for the current operating conditions indicated by the operational data 444.

Notably the performance limitations of the aircraft 10 may be impacted by certain operating conditions. For example, if the aircraft 10 is battery powered, the performance limitations may change as the available power in the battery reduces. As an example, if the available power falls below a threshold, it may be desirable to limit some maneuvers that would otherwise consume considerable power. In such case, the mission logic 450 may limit the escape envelope 25 in order to eliminate at least some paths that would require excessive power under the current operating conditions. In this embodiment, the monitoring system 205 may have sensors for monitoring the power available or used by a battery and may determine indicative of an amount of power remaining in the battery based on such sensors. If such value falls below a threshold, the mission logic 450 may limit the escape envelope in order to eliminate at least some paths.

In addition, as described above, the failure of certain components (e.g., one or more propellers) may impact the aircraft's performance characteristics, and the mission logic 450 may limit the escape envelope 25 in order to eliminate at least some paths that the aircraft 10 is no longer capable of flying due to component failures. Further, it may be desirable to limit the escape envelope 25 based on other factors.

For example, the escape envelope 25 may be limited to eliminate paths within the envelope 25 that would undesirably cause the aircraft 10 to fly into restricted airspace indicated by the route data 445 or to fly too close to a known obstacle indicated by the route data 445. In addition, the escape envelope 25 may be limited based on the weather data 446 in order to eliminate paths within the envelope 25 that would cause the aircraft 10 to fly into an undesired weather phenomena, such as icing or a thunderstorm. Note that the weather indicated by the weather data 446 may also affect the performance characteristics calculated by the mission logic 450. As an example, strong winds might prevent the aircraft 10 from flying at least some paths that would otherwise be possible in the absence of wind.

Other factors may similarly affect the boundaries of the escape envelope 25. As an example, the weight of the cargo may affect how quickly the aircraft 10 can climb or turn and, thus, affect the range of paths that the aircraft may be capable of flying. In addition, when a passenger is onboard the aircraft 10, as indicated by the aircraft data 443, it may be desirable to limit the escape envelope 25 to eliminate at least some paths (such as paths requiring a high turn rate) that might cause some discomfort or anxiety to the passenger.

As noted herein, mission logic 450 is configured to dynamically update the escape envelope 25 and provide updated versions to the sense and avoid element 207. In some embodiments, when mission logic 450 determines that information has changed to a degree that will affect a validity of the escape envelope 25, the logic 450 may generate an updated envelope 25 and provide it to the element 207. The logic 450 may be configured to perform such operations repeatedly when such changes are detected or as desired.

After the mission logic 450 provides an escape envelope 25 to the sense and avoid element 207 and thereafter receives a proposed escape path 35 from the sense and avoid element 207, the mission logic 450 is configured to validate the escape path 35 and provide a validated escape path to the vehicle controller 220. In this regard, the mission logic 450 is configured to compare information on which the escape path 35 is based (e.g., information used to generate escape envelope 25) against the most current information available (e.g., updated information in aircraft data 443, operational data 444, route data 445, and weather data 446). The logic 450 may use various information to validate the proposed escape path 35, such as updated location and velocity of the object 15, distance between the aircraft in the object 15, and the operating conditions of the aircraft 10. As an example, the mission logic 450 may process aircraft data 443 and determine that aircraft 10 has encountered an issue (e.g., battery failure or other component malfunction, etc.) that affects energy available to perform the maneuvers required to follow the proposed path 35. Alternatively, the path may bring the aircraft 10 within a distance relative to current location of the object 15 that falls below a desired threshold or buffer distance. As noted above, the mission logic 450 is configured to dynamically generate and provide updated escape envelopes to the sense and avoid element 207, and is configured to dynamically validate each proposed escape path 35 received from the element 207. The mission logic 450 may receive proposed escape paths and dynamically check viability against information available to the mission processing element 210.

Figure 6:
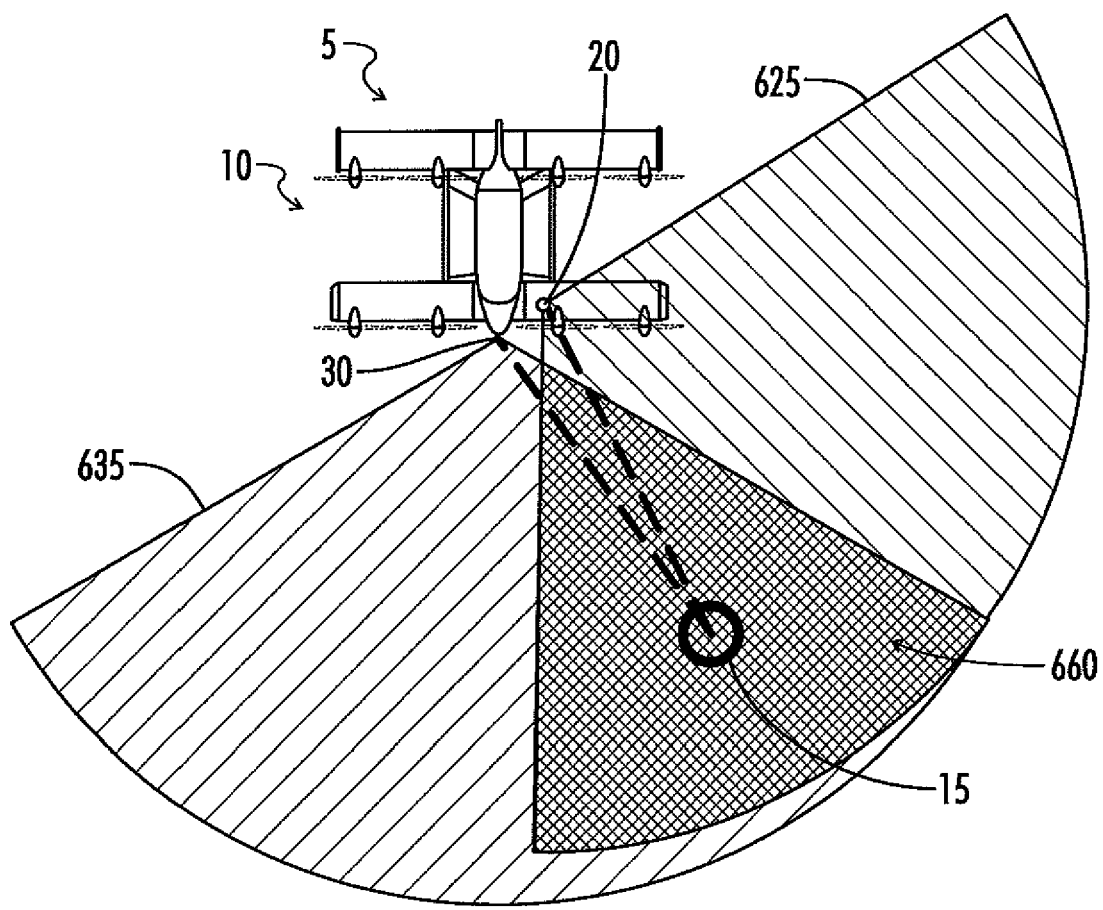
FIG. 6 is a top perspective view of an aircraft, such as is depicted by FIG. 1, in accordance with some embodiments of the present disclosure.

FIG. 6 is a top perspective view of the aircraft 10 such as is depicted in FIG. 1 in accordance with some embodiments of the present disclosure. The aircraft in FIG. 6 has sensors 20, 30 with ranges 625, 635 that overlap for redundant sensing of space around the vehicle 10. As shown by FIG. 6, an overlapping region 660 allows for redundant sensing of the overlapping area, as well as sensor calibration when an object 15 is within the overlapping portion 660. Additional techniques for performing sensor calibration are described more fully in PCT Application No. PCT US/2017/25592 which is incorporated herein by reference in its entirety. In an exemplary operation of aircraft monitoring system 5, each of the sensors 20, 30 may sense the object 15 and provide data that is indicative of the object's position and velocity to sense and avoid element 207, as described above.

Sense and avoid element 207 (e.g., logic 350) may process the data from each sensor 20, 30 and may note discrepancies between information indicated by data from each sensor (e.g., based on sensor data 343 or otherwise). Sense and avoid logic 350 further may resolve discrepancies present within data from sensors 20, 30 based on various information such as calibration data for each sensor 20, 30 that may be stored as sensor data 343 or otherwise in other embodiments. In this regard, sense and avoid logic 350 may be configured to ensure that information about objects sensed by a sensor 20 of the aircraft 10 is accurate for use by resources of the system 5 in generating an escape envelope and selecting and validating an escape path, as described above.

Figure 7:
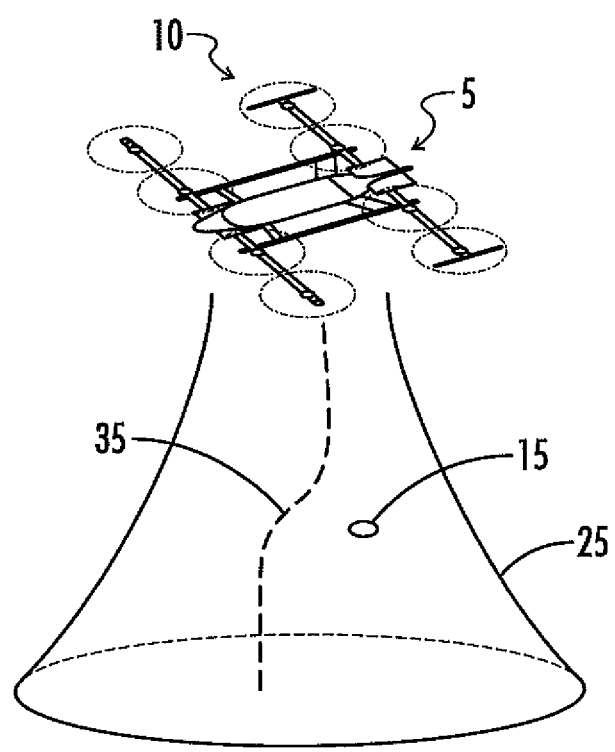
FIG. 7 is a three-dimensional perspective view of an aircraft, such as is depicted by FIG. 1, in accordance with some embodiments of the present disclosure.

FIG. 7 is a three-dimensional perspective view of an aircraft 10 such as is depicted by FIG. 1 in accordance with some embodiments of the present disclosure. FIG. 7 provides an exemplary illustration of an operation of the system 5 in the context of substantially vertical flight operations of a VTOL aircraft 10 (e.g., during landing or takeoff). The aircraft 10 of FIG. 7 has transitioned from a horizontal flight mode (e.g., cruise mode) into a vertical flight configuration (e.g., a landing or takeoff configuration). In some embodiments, the aircraft 10 may be configured to move in a substantially vertical direction, such as for a predetermined distance between a landing or takeoff location and safe horizontal flight altitude.

When the aircraft 10 transitions from its cruise mode into takeoff and landing mode, aircraft monitoring system 5 may process data from sensors that are configured and oriented in the direction of motion of the aircraft 10. In this regard, aircraft 10 and aircraft monitoring system 5 are configured to sensor data from sensors 20 that are configured and oriented to sense space that is in the direction of motion of the aircraft 10. Based on the sensed data, the system 5 has generated and provided an escape envelope 25, and will propose and validate an escape path 35 that will allow the aircraft 10 to avoid the object 15 while landing.

In sensing and avoiding objects 15 in hover flight, the aircraft 10 may use the same techniques described above, with an escape envelope 25 that is oriented in the direction of movement (i.e., vertically). Thus, similar to the techniques described above for forward flight, the sense and avoid element 207 may detect one or more objects 15 that pose a collision risk to the aircraft 10 in hover flight, classify the objects 15, determine the performance characteristics of the objects 15, and assess the threat risk of each classified object 15. Using the techniques described herein, the sense and avoid element 207 may select an escape path 35 for avoiding the sensed object 15 or make other decisions. Notably, one or more of the objects 15 may be on the ground, such as people, animals, or vehicles on or near the landing zone. As an example, in response to a sensed threat, such as an object 15 on the landing zone, the sense and avoid element 207 may decide to slow or stop downward movement, thereby hovering over the landing zone, while monitoring the objects 15 to determine when continued movement to the landing zone is safe. Alternatively, the sense and avoid element 207 may select a new landing zone and an escape path 25 that takes the aircraft 10 to the new landing zone. Other decisions in response to sensed objects 15 are possible in other examples.

Note that, in some embodiments, aircraft monitoring system 5 (e.g., sense and avoid element 207 and mission processing element 210) may be configured to perform certain safety and precautionary functionality to decrease a risk of collision with objects during times of increased exposure to risk presented to the aircraft 10 at takeoff and landing. Aircraft monitoring system 5 (e.g., sense and avoid element 207 and mission processing element 210) may perform a check of sensors when performing takeoff and landing maneuvers to confirm that no objects 15 are within the path of the aircraft 10. For example, before aircraft controller 220 initiates the propulsion system 230, the aircraft monitoring system 5 may monitor data sensed by one or more sensors 20 oriented to sense the area where the aircraft will travel during takeoff (e.g., above the aircraft 10) and, if an object 15 is present within the area, prevent the aircraft controller 220 from beginning initiation of the propulsion system 230 (e.g., starting the propellers, increasing engine power, or otherwise).

In addition, prior to takeoff, the sense and avoid element 207 may check the sensor data 343 from the sensors 20, 30 to determine that there is no object on the ground close to the aircraft 10 that might be struck by the aircraft 10, such as a rotating propeller blade. In this regard, it is possible for a person or animal to wander onto the takeoff area and be in danger of a strike by the aircraft's propellers when they are turned on. If the sense and avoid element 207 detects a presence of an object near the aircraft and, in particular, the aircraft's propellers or engines, the sense and avoid element 207 may notify the mission processing element 210, which communicates with the aircraft controller 220 to disable operation of the propellers or engines until it can be confirmed that the object is no longer a collision threat.

In some embodiments, the aircraft monitoring system 5 may be configured to confirm that no objects are present during landing operations. If the aircraft monitoring system 5 determines that an object 15 is within the area or otherwise present the collision risk to the aircraft 10 during landing, the system 5 may take any of several actions to prevent the aircraft 10 from colliding with the object 15. As an example, if aircraft monitoring system 5 senses that an object 15 is in motion and will leave the area so that it no longer presents the collision risk to the aircraft 10, the system 5 may cause the vehicle to wait by hovering while the object 15 continues to travel away from the path of the aircraft 10. However, if the object 15 is stationary within a path of the vehicle 10, aircraft monitoring system 5 may determine an escape path 35 with an escape envelope 25 and provide a signal to the aircraft controller 220 to control the aircraft 10 to follow the escape path, as described above.

In several embodiments described above, the sense and avoid element 207 and mission processing element 210 are described as separate units, each having its own processor or set of processors to perform the functions ascribed to these elements. However, it is unnecessary for the sense and avoid element 207 and the mission processing element 210 to be separate in other embodiments. As an example, it is possible for the sense and avoid element 207 and mission processing element 210 to be integrated or to share processors or other resources. Separating the functions of the sense and avoid element 207 and the mission processing element 210 on different hardware (e.g., processors) may have certain advantages.

Specifically, using different processors or other hardware for the sense and avoid element 207 and the mission processing element 210 helps to spread the processing burdens associated with these elements across hardware resources. In addition, separating the elements 207, 210 helps to isolate one element from a hardware failure that may be affecting the other element. Furthermore, using different processors or other hardware for the sense and avoid element 207 and the mission processing element 210 may help to reduce design and manufacturing costs by making aircraft type transparent to the sense and avoid element 207.

In this regard, the configuration of the sense and avoid element 207 may be such that it is capable of operating on many different types of aircraft, and the mission processing element 210 may be configured or programmed for the specific type of aircraft 10 on which it resides. Thus, the design of the aircraft control system 225, as well as the aircraft data 443 and operational data 444 stored in the memory 420, may be tailored to the type of aircraft 10 on which the system 225 resides, whereas the sense and avoid element 207 does not need to be uniquely configured for the aircraft type. That is, the sense and avoid element 207 receives an escape envelope 25 that is based on the aircraft type, including the aircraft's capabilities, and is capable of processing the escape envelope 25 to select an escape path 35 within the envelope 25 without any knowledge specific to the aircraft's capabilities or configurations other than the escape envelope 25 that is provided by the mission processing element 210. Thus, the sense and avoid element 207 may be used on any of various aircraft without having to redesign the sense and avoid element 207 for the specific aircraft type on which it is used.

Figure 8:
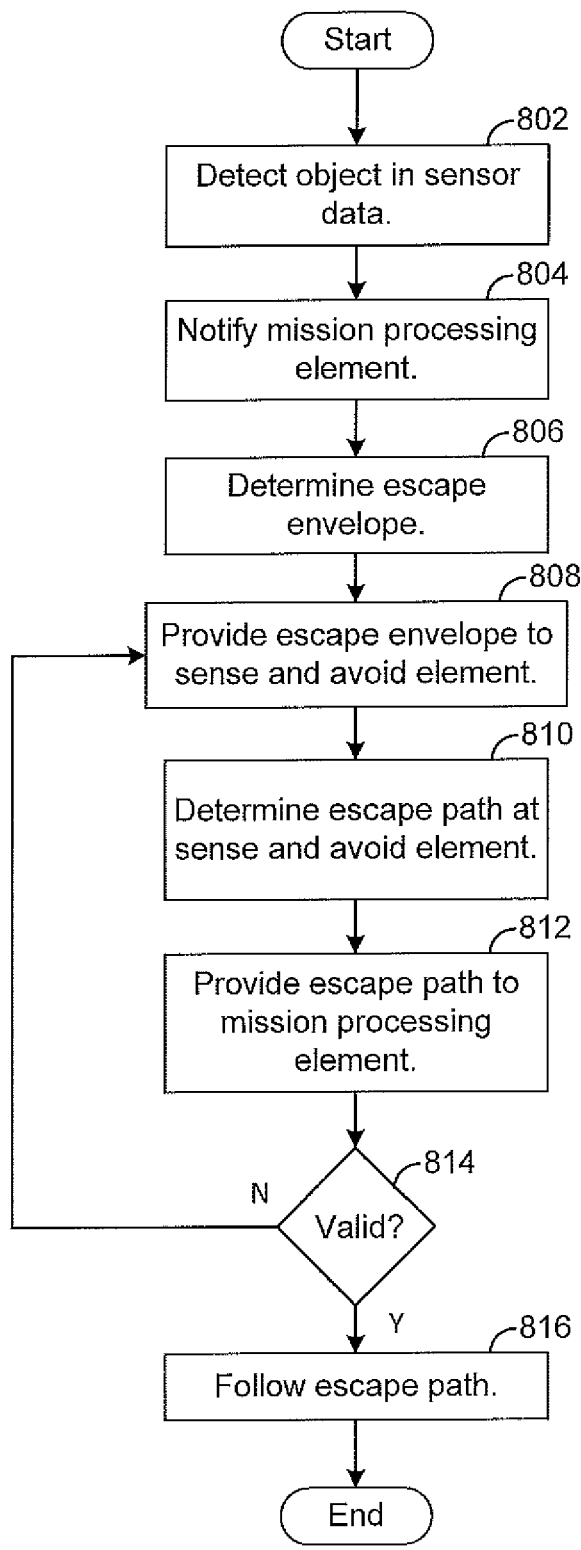
FIG. 8 is a flow chart illustrating a method for sensing and avoiding external objects in accordance with some embodiments of the present disclosure.

An exemplary use and operation of the system 5 in order to sense and avoid objects within a path of the aircraft 10 will be described in more detail below with reference to FIG. 8. For illustrative purposes, it will be assumed that an object 15 is within the path of aircraft 10 and field of view of at least one sensor 20, 30.

At step 802, sense and avoid element 207 may receive data from one or more sensors 20, 30, and the sense and avoid logic 350 may detect an object within the sensor data. Based on the information about the object 15 sensed by the sensors 20, 30, (e.g., location, velocity, mass, size, etc.), the sense and avoid element 207 may classify the object 15 or, in other words, identify an object type for the detected object 15. Thereafter processing may continue to step 804, where sense and avoid element 207 may notify the mission processing element 210 that a collision threat has been detected.

At step 806, the mission processing element 210 may determine an escape envelope 25 for the aircraft 10. The mission processing element 210 may generate the escape envelope 25 as described above and provide it to the sense and avoid element 207 for identification of a proposed escape path at step 808. After the sense and avoid element 207 has received the escape envelope from the mission processing element 210, the sense and avoid element 207 may process the escape envelope 25 and determine an escape path 35 for the aircraft 10. For example, the escape path 35 within the envelope 25 may identify a path for the aircraft 10 to follow that avoids the risk of collision with the object 15, and then returns the aircraft 10 to a point that is along the original route to the aircraft's destination. After the sense and avoid element 207 has determined an escape path 35, the sense and avoid element 207 may provide the escape path to the mission processing element 210 at step 812.

When mission processing element 210 receives the escape path 35, the mission processing element 210 may validate the escape path at step 814. Mission processing element 210 may perform the validation by determining whether the proposed escape path 35 is within an updated escape envelope 25 based on changes to information used to generate the previous escape envelope 25. If not, processing returns to step 808 where mission processing element 210 provides the updated escape envelope 25 to the sense and avoid element 207. If the proposed path 35 is within the updated escape envelope 25, mission processing element 210 is configured to determine the proposed escape path 35 is valid, and processing may continue to step 818, where the mission processing element 210 provides information indicative of the escape path 35 to aircraft controller 220 to control the aircraft 10 to follow the escape path 35. Note that the process shown by FIG. 8 may be repeated as may be desired. For example, as the aircraft 10 is following the escape path 35, the aircraft's environment and operating conditions may be reassessed and a new escape path 35 may be selected based on changing conditions, such as movements by the aircraft 10 and objects 15.

Figure 9:
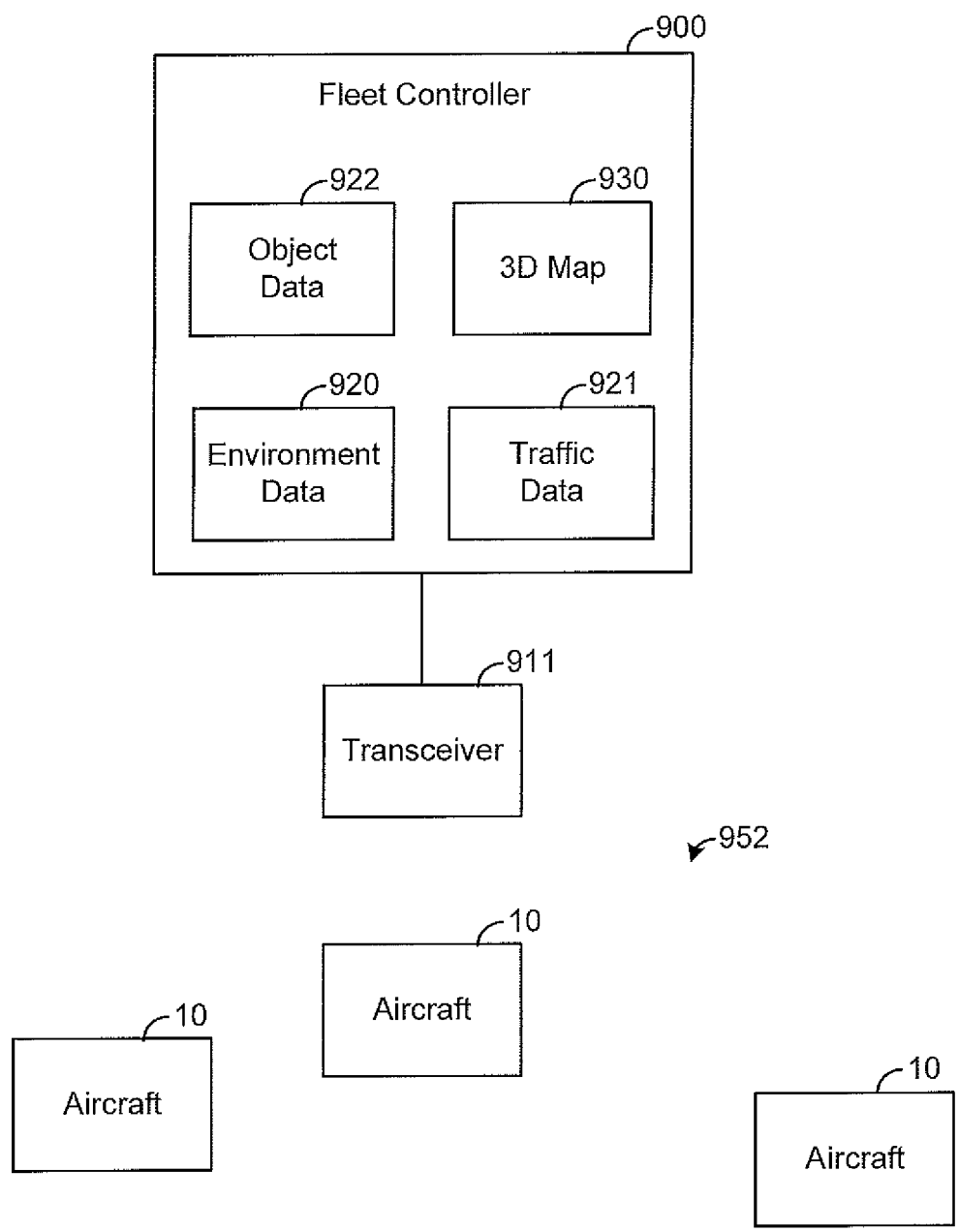
FIG. 9 is a block diagram illustrating a fleet controller in accordance with some embodiments of the present disclosure.

In some embodiments, sensing and avoiding operations may be facilitated through the use of communication with a controller 900 (FIG. 9), referred to hereafter as "fleet controller," that receives and processes information from multiple aircraft 10, collectively referred to herein as a "fleet" 952. Such fleet controller 952 may be at any location, such as at a ground-based facility (e.g., an air traffic control tower) or other location. The fleet controller 900 may be various types of devices capable of receiving and processing information from the aircraft 10. The fleet controller 900 may be implemented in hardware or a combination of hardware and software/firmware. As an example, the fleet controller 900 may comprise one or more application-specific integrated circuits (ASICs), field-programmable gate arrays (FPGAs), microprocessors programmed with software or firmware, or other types of circuits for performing the described functionality. Similar to the sense and avoid element 207 and the mission processing element 210 described above, the fleet controller 900 may have one or more CPUs, DSPs, GPUs, FPGAs or other types of processing hardware. As shown by FIG. 9, the fleet controller 900 may be coupled to at least one transceiver 911 for enabling communication with the aircraft 10 or other systems located remotely from the fleet controller 900. In this regard, the fleet controller 900 may be in wireless communication with a fleet 952 of aircraft 10.

Any of the aircraft 10 of the fleet 952 may communicate with the fleet controller 900 directly or through other devices (e.g., repeaters) that may be positioned at various locations around the vicinity of the fleet 952. If desired, the sense and avoid elements 207 of various aircraft 10 may communicate with one another to exchange information on sensed objects 15, as described above. Such sense and avoid elements 207 may also serve as repeating, routing or switching functions for messages communicated by the aircraft 10, such that the fleet 952 of aircraft 10 forms a wireless mesh network. Such mesh network may be used for communication between aircraft 10, as a well as communication between the fleet controller 900 and the aircraft 10.

As shown by FIG. 9, the fleet controller 900 also has memory for storing various information, such as environment data 920, traffic data 921, and object data 922. The environment data 920 indicates various information about the environment in which the aircraft 10 of the fleet operate. As an example, the environment data 920 may store information indicating the terrain, including ground-based obstacles, such as buildings, bridges, towers, etc., over which the aircraft 10 operate. The environment data 920 may also indicate information about the airspace through which the aircraft 10 fly, such as areas of restricted airspace. The environment data 920 may also indicate areas associated with certain collision risks, referred to herein as "high risk areas." As an example, the environment data 920 may identify a region associated with a high volume of traffic, such as an area around an airport, as a high risk area. Note that such designation may be temporal (e.g., limited to certain times, such as certain hours of the day or days of the week or month). As an example, the traffic in a given area may be high only during certain hours of the day and thus be designated as a high risk area only during such hours. In another example, an area where fireworks are shot only at certain times may be designated as a high risk area for such time periods. The environment data 920 may correlate each high risk area with information indicating the type of risk (e.g., high traffic or fireworks) associated with the high risk area. Such information may be useful for assessing the degree of risk that is associated with the area and whether paths through the area should be selected under certain circumstances.

If desired, the fleet controller 900 may transmit the environment data 920 to the aircraft 10, which may use the data 920 for sense and avoid functions. As an example, the sense and avoid element 207 may select a desired path based on the environment data 920. Further, the sense and avoid element 207 may limit, when possible, the selection of escape paths 35 that pass through high risk areas. In addition, the route data 445 (FIG. 5) may be defined or updated at least in part based on the environment data 920. As an example, an escape envelope 25 may be defined to avoid restricted airspace or high risk areas identified by the environment data 920.

The traffic data 921 indicates information about the aircraft 10 of the fleet 952, such as the location of each aircraft 10, the velocity of each aircraft 10, the route of each aircraft 10, the aircraft type of each aircraft, and/or other information useful in tracking the aircraft 10 and avoiding collisions. Such information may be communicated from cooperative aircraft to the fleet controller 900. The information about one aircraft 10 may also be communicated by another aircraft 10. As an example, the sense and avoid element 207 of a first aircraft 10 may sense the location of a second aircraft 10 and report such location to the fleet controller 952, which may compare locations about the second aircraft 10 from many aircraft 10 to provide a redundancy check to help ensure the integrity and accuracy of the traffic data 921.

The object data 922 indicates information about objects 15, such as other aircraft 10 (whether or not such other aircraft 10 are cooperative), birds, and other types of collision risks. The sense and avoid element 207 of each aircraft 10 within the fleet 952 may transmit to the fleet controller 952 information indicative of the objects 15 by the sense and avoid element 207, and the fleet controller 952 may then compile such information into the object data 922 stored at the fleet controller 952. The information about the same object 15 from multiple aircraft 10 may be compared to identify and resolve discrepancies in order to help ensure the integrity and accuracy of the object data 922. Further, the fleet controller 900 may be configured to transmit the object data 922 to the aircraft 10 of the fleet 952 so that the aircraft 10 can update its data so that each aircraft 10 has a consistent and accurate view of the objects 15 within the environment monitored by the fleet controller 900 and fleet 952.

In some embodiments, the fleet controller 900 may use the environment data 920, the traffic data 921, and the object data 922 to define a three-dimensional (3D) map 930 or other type of map indicative of the region through which the aircraft 10 fly. Such map 930 may indicate the locations of terrain and ground-based obstacles, as well as the locations of aircraft 10 and objects 15 in the airspace. The map 930 may also include other information associated with the aircraft 10 and objects 15, such as their velocities, routes, and other information to the extent that such information is known by the fleet controller 900. The fleet controller 900 may be configured to transmit the 3D map 930 to each aircraft 10, which may then use the map 930 for collision avoidance. As an example, the map 930 may be used to select routes and escape paths. Further, data at an aircraft 10 may be updated based on the map 930 as may be desired.

By communicating information among the aircraft 10, it is possible for one aircraft 10 to learn from and benefit from the experiences or knowledge gained by another aircraft 10. As an example, assume that a new obstacle, such as building or tower is erected, but the aircraft 10 of the fleet are unaware of the presence of the obstacle. As a first aircraft 10 approaches the obstacle, it may sense the obstacle's presence using sensors 20, 30 and, if necessary, adjust its route in order to avoid it. If the sense and avoid element 207 classifies the obstacle as a ground-based on obstacle, it may update its route data 445 to include the obstacle as part of the terrain defined by such data 445. Thus, future decisions about selecting routes and defining escape envelopes 35 may be based on the updated route data 445 thereby factoring the presence of the obstacle in such decisions.

In addition, the first aircraft 10 may transmit information indicative of the newly-detected obstacle to the fleet controller 900, which may update the environment data 920 and/or map 930 to include the obstacle. Thus, when the updated environment data 920 or map 930 is distributed to the other aircraft 10 of the fleet 952, such other aircraft 10 can update the route data 445 to indicate the presence of the obstacle. Thus, each aircraft 10 of the fleet 900 can be informed of the newly-detected obstacle and make control decisions based on the newly-detected obstacle as appropriate even before such aircraft detects it with its own sensors 20, 30. As an example, the sense and avoid element 207 may select a path that avoids the obstacle based on the obstacle's presence even before the obstacle is sensed with the aircraft's sensors 20, 30.

In any event, the information stored at the fleet controller 900 defines both a risk model and a behavior model associated with the environment in which the aircraft 10 operate. The risk model indicates areas associated with elevated levels of risk and also indicates the type or types of risks that are associated with each such area. The behavior model indicates the locations of aircraft 10 and other objects 15 within the monitored region. Both models are temporal in that they change over time. A given model may be in real time, indicating the types of risks or behaviors that are currently observed, and the model may also define a history from which patterns may be recognized so that risk predictions and assessments can be accurately made. As an example, by observing a higher volume of traffic over a certain region, such as near an airport, during a certain time of day, the region may be predicted as a high risk area for the same period of the day in the future. The behavior and risk models determined by the fleet controller 900 may be shared with the aircraft 10 to assist them in making better informed sense and avoid decisions. Thus, based on the risk and behavior models, an aircraft 10 may make better route selection decisions by taking into account predicted risks and behaviors so as to avoid certain regions that will likely be associated with greater risk in the future based on past patterns recognized by the fleet controller 900 or otherwise.

Figure 10:
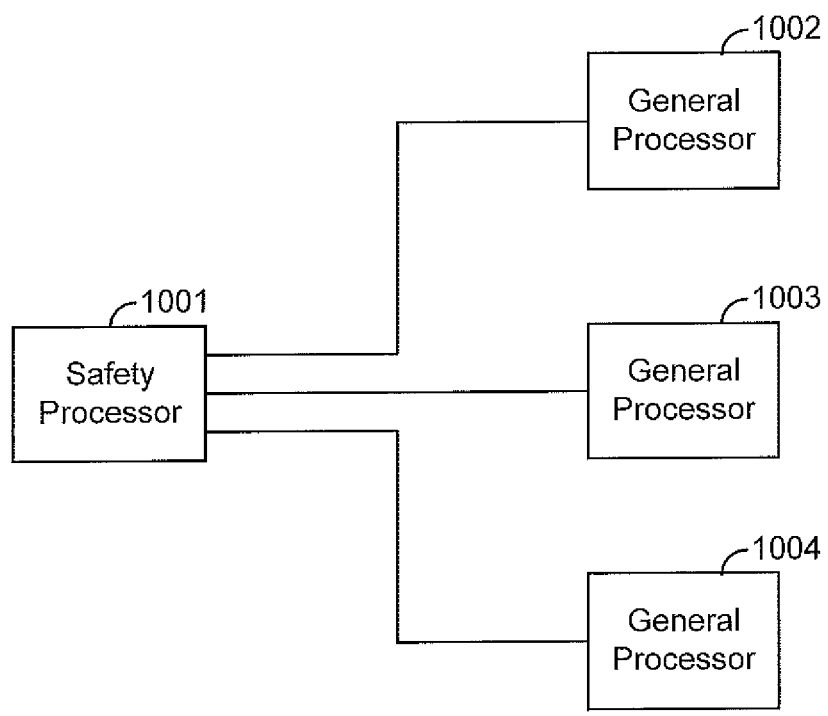
FIG. 10 is a block diagram illustrating a sense and avoid element in accordance with some embodiments of the present disclosure.

As described above, it is possible for the aircraft 10 to use processing hardware in parallel in order to perform redundant functions for enhancing aircraft safety. FIG. 10 depicts an exemplary embodiment of a sense and avoid element 207 where multiple processors 1001-1004 are used to perform the functionality described herein for the sense and avoid element 207. FIG. 10 shows one safety processor 1001 and three other processors 1002-1004, referred to hereafter as "general processors," but the sense and avoid element 207 may employ any number of safety processors 1001 and other types of processors 1002-1004 in other embodiments.

The safety processor 1001 is specifically designed for safe operation such that it is less likely to have errors or to fail relative to the general processors 1002-1004. In some embodiments, the safety processor 1001 may be designed to meet certain processor safety standards promulgated by the International Organization for Standardization (ISO) or other standards-based organization. In order to meet such standards, the safety processor 1001 may be designed to operate slower than the processing speeds of the general processors 1002-1004, which are not designed to achieve the same safety qualification or operate with the same safety margins as the safety processor 1001.

In the embodiment shown by FIG. 10, each general processor 1002-1004 is configured to make escape path selections according to the techniques described herein. Thus, when an object 15 is detected, each processor 1002-1004 receives the escape envelope 25 from the mission processing element 210 and selects an escape path 35 based on the escape envelope 25 and other factors, as described above. If desired, each general processor 1002-1004 may use the same algorithm for selecting an escape path 35, or any general processor 1002-1004 may use a different algorithm relative to the other general processors. In some embodiments, each processor 1002-1004 uses machine learning to learn how to select escape routes 35 based on one or more sets of the training data. Such a non-deterministic method for sense and avoid decisions may result in discrepancies between the paths that are selected by the general processors 1002-1004 for the same input. Discrepancies may also result from erroneous operation of any of the general processors 1002-1004.

Each general processor 1002-1004 is configured to report its escape path selection to the safety processor 1001, which then compares the escape path selections and resolves any discrepancies that may exist between the selections. As an example, if two general processors 1002-1003 choose the same escape path or similar escape paths while the other processor 1004 chooses a significantly different escape path, the safety processor 1001 may be configured to use the escape path or one of the escape paths selected by the higher number of processors 1002-1003. After deciding on the escape path to use, the safety processor 1001 reports the selected escape path to the mission processing element 210, which validates and uses the selected escape path, as described above.

Note that other sense and avoid decisions by the general processors 1002-1004 may be similarly reported to and monitored by the safety processor 1001. As an example, decisions about whether an object 15 is detected in the data from sensors 20, 30, classifications of the objects 15, risk assessments, and other decisions of the sense and avoid element 207 described above may be made each general processor 1002-1004, and the safety processor 1001 may compare such decisions and resolve discrepancies among them according to any desired algorithm.

In addition, based on the data received from the general processors 1002-1004, the safety processor 1001 is configured to monitor the operation of the general processors 1002-1004 to determine when a general processor has failed such that corrective action is desirable. In this regard, the safety processor 1001 performs a watchdog function for the general processor 1002-1004. As an example, if the decisions by a given general processor 1002 differ by a certain amount relative to the decisions by the other general processors 1003-1004 over time, the safety processor 1001 may determine that the general processor 1002 has failed. In other embodiments, other techniques for detecting a failure of a general processor are possible. When a general processor is determined to have failed, the safety processor 1001 may be configured to take corrective action, such as deactivating the failed processor or ignoring its output for future control decisions. If the safety processor 1001 is unable to resolve which general processor 1002-1004 is providing valid data and which has likely failed, the safety processor 1001 may take other types of corrective action, such as instructing the mission processing element 210 to perform an emergency landing of the aircraft 10 or transition to hover flight in order to reduce the likelihood that the aircraft 10 will strike an external object 15. In yet other examples, other types of corrective action are possible.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A monitoring system for an aircraft, comprising:
   a plurality of sensors for sensing an object external to the aircraft;
   memory for storing data indicative of predefined flight performance characteristics of the aircraft;
   an aircraft control system having at least one processor configured to determine an escape envelope for the aircraft based on current operating conditions of the aircraft and the data indicative of the predefined flight performance characteristics of the aircraft, the escape envelope defining possible paths that the aircraft may follow to avoid the object; and
   a sense and avoid element having at least one processor configured to receive first data indicative of the escape envelope from the aircraft control system and to receive second data indicative of an object sensed by the plurality of sensors, the at least one processor of the sense and avoid element configured to select a path for avoiding the object based on the escape envelope,
   wherein the aircraft control system is configured to control a direction of the aircraft based on the selected path.

2. The monitoring system of claim 1, wherein the at least one processor of the sense and avoid element is configured to receive information about the object from a second aircraft and to select the path for avoiding the object based on the information from the second aircraft.

3. The monitoring system of claim 1, wherein the at least one processor of the sense and avoid element is configured to classify the object based on the second data, thereby determining an object type for the object, and wherein the at least one processor of the sense and avoid element is configured to select the path for avoiding the object based on the determined object type for the object.

4. The monitoring system of claim 3, wherein the memory is configured to store third data indicative of predefined flight performance characteristics for the object type, wherein the at least one processor of the sense and avoid element is configured to select the path for avoiding the object based on the third data.

5. The monitoring system of claim 1, wherein the memory is configured to store third data indicative of a weight of at least one passenger or cargo on the aircraft, wherein the at least one processor of the aircraft control system is configured to determine the escape envelope based on the third data.

6. The monitoring system of claim 1, wherein the at least one processor of the aircraft control system is configured to determine when a component of the aircraft has failed and to determine the escape envelope based on a sensed failure of the component.

7. The monitoring system of claim 1, wherein the at least one processor of the aircraft control system is configured to determine a value indicative of an amount of power remaining for a battery of the aircraft and to determine the escape envelope based on the value.

8. The monitoring system of claim 1, wherein the memory is configured to store third data indicative of a route for the aircraft, wherein the at least one processor of the aircraft control system is configured to determine the escape envelope based on the third data.

9. The monitoring system of claim 1, wherein the at least one processor of the aircraft control system is configured to determine the escape envelope based on weather data indicative of weather in a vicinity of the aircraft.

10. The monitoring system of claim 1, wherein the at least one processor of the aircraft control system is configured to determine whether a passenger is on the aircraft and to determine the escape envelope based on whether a passenger is determined to be on the aircraft.

11. The monitoring system of claim 1, wherein the at least one processor of the aircraft control system is configured to validate the path for avoiding the object based on updated operating conditions of the aircraft.

12. A monitoring system for an aircraft, comprising:
a plurality of sensors for sensing an object external to the aircraft;
an aircraft control system having at least one processor configured to determine an escape envelope for the aircraft based on current operating conditions of the aircraft, the escape envelope defining possible paths that the aircraft may follow to avoid the object; and
a sense and avoid element having a plurality of processors configured to receive first data indicative of the escape envelope from the aircraft control system and to receive second data indicative of an object sensed by the plurality of sensors, each of the plurality of processors configured to select a respective path for avoiding the object based on the escape envelope,
wherein the sense and avoid element has a safety processor operating at a processing speed lower than processing speeds for the plurality of processors, and wherein the safety processor is configured to select a path for avoiding the object based on the paths for avoiding the object selected by the plurality of processors, and wherein the aircraft control system is configured to control a direction of the aircraft based on the path selected by the safety processor.

13. A monitoring system for an aircraft, comprising:
a plurality of sensors for sensing an object external to the aircraft and providing sensor data indicative of the object;
memory for storing data indicative of predefined flight performance characteristics of the aircraft;
at least one first processor configured to determine an escape envelope for the aircraft based on the current operating conditions of the aircraft and the data indicative of the predefined flight performance characteristics of the aircraft, wherein the escape envelope defines possible paths that the aircraft may follow to avoid the object;
at least one second processor configured to select a path for avoiding the object based on the sensor data and the escape envelope; and
an aircraft controller configured to control a direction of the aircraft based on the selected path.

14. The monitoring system of claim 13, wherein the at least one second processor is configured to receive information about the object from a second aircraft and to select the path for avoiding the object based on the information from the second aircraft.

15. The monitoring system of claim 13, wherein the at least one second processor is configured to classify the object based on the sensor data, thereby determining an object type for the object, and wherein the at least one second processor is configured to select the path for avoiding the object based on the determined object type for the object.

16. The monitoring system of claim 15, wherein the memory is configured to store data indicative of predefined flight performance characteristics for the object type, wherein the at least one second processor is configured to select the path for avoiding the object based on the data indicative of the predefined flight performance characteristics for the object type.

17. The monitoring system of claim 13, wherein the memory is configured to store data indicative of a weight of at least one passenger or cargo on the aircraft, and wherein the at least one first processor is configured to determine the escape envelope based on the data indicative of the weight of the at least one passenger or cargo.

18. The monitoring system of claim 13, wherein the at least one first processor is configured to determine when a component of the aircraft has failed and to determine the escape envelope based on a sensed failure of the component.

19. The monitoring system of claim 13, wherein the at least one first processor is configured to determine a value indicative of an amount of power remaining for a battery of the aircraft and to determine the escape envelope based on the value.

20. The monitoring system of claim 13, wherein the memory is configured to store data indicative of a route for the aircraft, and wherein the at least one first processor is configured to determine the escape envelope based on the data indicative of the route.

21. The monitoring system of claim 13, wherein the at least one first processor is configured to determine the escape envelope for avoiding the object based on weather data indicative of weather in a vicinity of the aircraft.

22. The monitoring system of claim 13, wherein the at least one first processor is configured to determine whether a passenger is on the aircraft and to determine the escape envelope based on whether a passenger is determined to be on the aircraft.

23. The monitoring system of claim 13, wherein the at least one first processor is configured to receive information indicating the selected path from the at least one second processor and to validate the selected path for avoiding the object based on updated operating conditions of the aircraft and the data indicative of the performance characteristics of the aircraft, and wherein the aircraft controller is configured to control the direction of the aircraft based on the selected path in response to validation of the selected path by the at least one first processor.

24. The monitoring system of claim 15, wherein the at least one second processor is configured to retrieve information indicative of performance capabilities of objects associated with the determined object type and to determine a threat envelope for the object based on the information indicative of the performance capabilities of objects associated with the determined object type, and wherein the at least one second processor is configured to select the path for avoiding the object based on the threat envelope.

25. A monitoring system for an aircraft, comprising:
a plurality of sensors for sensing an object external to the aircraft and providing sensor data indicative of the object;
memory for storing data indicative of predefined flight performance characteristics of the aircraft;
a plurality of processors, each of the plurality of processors configured to select a respective path for avoiding the object based on the sensor data, the data indicative of the predefined flight performance characteristics of the aircraft, and the current operating conditions of the aircraft;
a safety processor operating at a processing speed lower than processing speeds for the plurality of processors, the safety processor configured to select a path for avoiding the object based on the paths for avoiding the object selected by the plurality of processors; and
an aircraft controller configured to control a direction of the aircraft based on the path selected by the safety processor.

26. A method for use on an aircraft for sensing and avoiding objects, comprising:
sensing an object external to the aircraft with sensors on the aircraft;
storing in memory data indicative of flight performance characteristics of the aircraft;
sensing current operating conditions of the aircraft with sensors on the aircraft;
selecting, with each processor of a plurality of processors on the aircraft, a respective path for avoiding the object based on the sensing the object, the data indicative of the flight performance characteristics of the aircraft, and the sensing the current operating conditions;
selecting with a safety processor a path for avoiding the object based on the paths for avoiding the object selected by the plurality of processors, the safety processor operating at a processing speed lower than processing speeds for the plurality of processors; and
controlling a direction of the aircraft based on the path selected by the safety processor.

27. A method for use on an aircraft for sensing and avoiding objects, comprising:
sensing an object external to the aircraft with sensors on the aircraft;
storing in memory data indicative of predefined flight performance characteristics of the aircraft;
sensing current operating conditions of the aircraft with sensors on the aircraft;
determining, with at least a first processor on the aircraft, an escape envelope for the aircraft based on the sensing the current operating conditions of the aircraft and the data indicative of the predefined flight performance characteristics of the aircraft, wherein the escape envelope defines possible paths that the aircraft may follow to avoid the object, and wherein the selecting is based on the escape envelope;
selecting, with at least a second processor on the aircraft, a path for avoiding the object based on the sensing the object and the escape envelope; and
controlling a direction of the aircraft based on the selected path.

28. The method of claim 27, further comprising receiving information about the object from a second aircraft, wherein the selecting is based on the information from the second aircraft.

29. The method of claim 27, further comprising classifying the object based on the sensing the object, wherein the selecting is based on the classifying.

30. The method of claim 27, further comprising storing, in the memory, data indicative of predefined flight performance characteristics for an object type for the object, wherein the selecting is based on the data indicative of the predefined flight performance characteristics for the object type.

31. The method of claim 27, further comprising storing, in the memory, data indicative of a weight of at least one passenger or cargo on the aircraft, wherein the determining the escape envelope is based on the data indicative of the weight of the at least one passenger or cargo.

32. The method of claim 27, further comprising determining when a component of the aircraft has failed, wherein the determining the escape envelope is based on the determining when the component of the aircraft has failed.

33. The method of claim 27, further comprising determining a value indicative of an amount of power remaining in a battery of the aircraft, wherein the determining the escape envelope is based on the value.

34. The method of claim 27, further comprising storing, in the memory, data indicative of a route for the aircraft, wherein the determining the escape envelope is based on the data indicative of the route.

35. The method of claim 27, wherein the determining the escape envelope is based on weather data indicative of weather in a vicinity of the aircraft.

36. The method of claim 27, further comprising determining whether a passenger is on the aircraft, wherein the determining the escape envelope is based on the determining whether the passenger is on the aircraft.

37. The method of claim 27, further comprising validating the path for avoiding the object based on updated operating conditions of the aircraft.

* * * * *